(12) United States Patent
Khsib

(10) Patent No.: US 11,930,222 B1
(45) Date of Patent: Mar. 12, 2024

(54) ENCODING VIDEO FOR FILM GRAIN SYNTHESIS

(71) Applicant: Amazon Technologies, Inc., Seattle, WA (US)

(72) Inventor: Ramzi Khsib, Surrey (CA)

(73) Assignee: Amazon Technologies, Inc., Seattle, WA (US)

( * ) Notice: Subject to any disclaimer, the term of this patent is extended or adjusted under 35 U.S.C. 154(b) by 39 days.

(21) Appl. No.: 17/218,050

(22) Filed: Mar. 30, 2021

(51) Int. Cl.
*H04N 19/86* (2014.01)
*G06T 5/00* (2006.01)
*G06T 5/20* (2006.01)
*H04N 19/117* (2014.01)
*H04N 19/176* (2014.01)
*H04N 19/80* (2014.01)

(52) U.S. Cl.
CPC ............ *H04N 19/86* (2014.11); *G06T 5/002* (2013.01); *G06T 5/20* (2013.01); *H04N 19/117* (2014.11); *H04N 19/176* (2014.11); *H04N 19/80* (2014.11)

(58) Field of Classification Search
None
See application file for complete search history.

(56) References Cited

U.S. PATENT DOCUMENTS

| | | | |
|---|---|---|---|
| 7,719,618 B2 | 5/2010 | Winger | |
| 8,023,567 B2 | 9/2011 | Gomila et al. | |
| 8,213,500 B2 | 7/2012 | Oh et al. | |
| 8,922,714 B2 | 12/2014 | Bhaskaran et al. | |
| 9,351,005 B2 * | 5/2016 | Wang | H04N 19/44 |
| 2007/0201813 A1 * | 8/2007 | Onoda | H04N 19/85 348/E5.077 |
| 2008/0192817 A1 * | 8/2008 | Llach | G06T 5/002 375/E7.17 |
| 2010/0150465 A1 * | 6/2010 | Lee | G06T 5/002 382/260 |
| 2010/0265334 A1 * | 10/2010 | Bhaskaran | H04N 19/61 348/180 |
| 2012/0076429 A1 * | 3/2012 | Segall | H04N 19/86 382/232 |
| 2012/0189216 A1 * | 7/2012 | Segall | H04N 19/86 382/232 |
| 2013/0182965 A1 * | 7/2013 | Rossato | H04N 19/37 382/233 |

(Continued)

*Primary Examiner* — Mohammad J Rahman
(74) *Attorney, Agent, or Firm* — Robert C. Kowert; Kowert, Hood, Munyon, Rankin & Goetzel, P.C.

(57) ABSTRACT

A system for encoding video for film grain synthesis is disclosed. A video encoding system includes a film grain description estimator configured to receive an input video comprising film grain and analyze the input video to generate a film grain description for the input video. The video encoding system includes a video encoder configured to receive the input video and, responsive to a determination that the input video comprises film grain, configure one or more encoder settings based on presence of the film grain to achieve a compression target for the input video. The video encoder is further configured to encode the input video comprising film grain using the encoder settings configured based on the presence of film grain to produce encoded video. The video encoding system is configured to send the encoded video and the film grain description to a video destination.

20 Claims, 7 Drawing Sheets

(56) References Cited

U.S. PATENT DOCUMENTS

| | | | |
|---|---|---|---|
| 2014/0037222 A1* | 2/2014 | Choudhury | G06T 7/0002 |
| | | | 382/235 |
| 2014/0092994 A1* | 4/2014 | Wang | H04N 19/40 |
| | | | 375/240.26 |
| 2014/0192149 A1* | 7/2014 | Wang | H04N 19/30 |
| | | | 348/43 |
| 2015/0271513 A1* | 9/2015 | Hendry | H04N 19/187 |
| | | | 375/240.26 |
| 2016/0021399 A1* | 1/2016 | Gomila | H04N 19/46 |
| | | | 375/240.18 |
| 2016/0198165 A1* | 7/2016 | Zhou | H04N 19/179 |
| | | | 375/240.16 |
| 2017/0230485 A1 | 8/2017 | Sulieman et al. | |
| 2019/0158885 A1* | 5/2019 | Mora | H04N 19/117 |
| 2019/0200014 A1* | 6/2019 | Toresson | H04N 19/82 |
| 2021/0275908 A1* | 9/2021 | Amer | G06T 7/215 |

* cited by examiner

ENCODING VIDEO FOR FILM GRAIN SYNTHESIS

BACKGROUND

Film grain is a property of visual content, such as photos and videos, that appear as a result of physical imperfections of the media on which the content is recorded or viewed. Film grain may appear as noise or grittiness when the content is viewed. Film grain provides an aesthetic element that viewers associate with watching movies. Currently, videos such as television shows and movies are typically stored in a digital format for viewing and/or streaming. Thus, bandwidth or storage reduction techniques may be applied to reduce the amount of storage used by the videos. However, film grain is inherently random or inconsistent in nature, so the presence of film grain in a video file may increase bandwidth or storage requirements despite the film grain itself is not part of the underlying content sought to be viewed.

Film grain filtering processes may reduce or remove film grain in videos to remove the random elements from the videos to improve compression of the videos. Generally, film grain being effectively random causes video compression algorithms to not work very well while the film grain is present in the videos. Conventionally, the film grain filtering process is destructive in nature such that the video is permanently modified thus permanently reducing visual fidelity of the content. Additionally, the film grain filtering process is typically not aware of how many bits produced for a given de-grained video frame. An encoder may then receive the de-grained video and apply a film grain to the de-grained video in order to have an output video that has film grain. The resulting re-grained video may end up having lower visual fidelity than the original video with an unnatural looking film grain.

Figure 1:
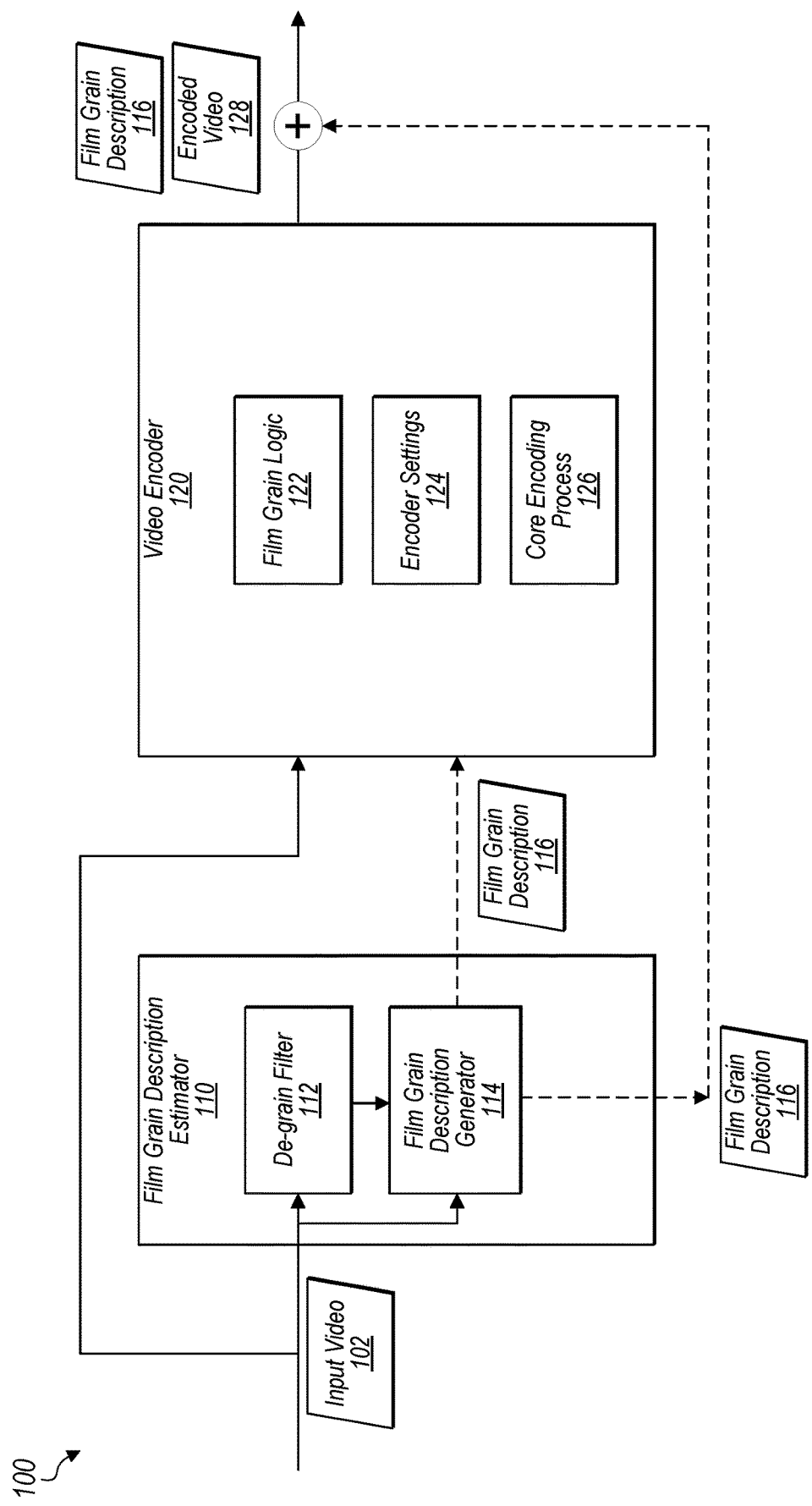
FIG. 1 is a block diagram illustrating a video encoding system that includes a film grain description estimator and a video encoder, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of systems and processes for encoder-side film grain synthesis is disclosed. The system may include a film grain parameter estimator and a video encoder to perform various tasks in synthesizing film grain in a video. The video, including film grain, may be provided to the film grain description estimator for generation of a film grain description. The film grain description estimator may filter the video remove the film grain from the video to generate a de-grained video. In some embodiments, the film grain parameter estimator may use a low-pass filter, a noise reducer filter, a Gaussian blurring kernel, or any other suitable filter to reduce or remove the appearance of the film grain in the video. Removal of the film grain may be performed by a film de-grainer that may have a lower computational cost such that maintaining visual fidelity is not prioritized while de-graining the video. The film de-grainer is typically destructive in operation, such that the output video is irreversibly modified or changed relative to the input video.

After generating the de-grained video, the film grain description estimator may identify candidate blocks or, alternatively, candidate frames that may be analyzed for generating the film grain description. The candidate blocks may have a relatively low complexity or a relatively low amount of texture compared to other blocks or frames. The candidate blocks that have a relatively low complexity or a relatively low amount of texture may be referred to as "flat" with respect to their textures. Some examples of flat textures may include solid color backgrounds or relatively lower amounts of different colors with respect to other scenes in the video. The candidate blocks may include a representative amount of film grain that is present throughout the video such that the amount of film grain in the candidate blocks or frames is indicative of the amount of film grain in another block in the video. Therefore, the candidate blocks may serve as a basis for estimating and/or generating film grain description.

The film grain description estimator may estimate the film grain parameters by analyzing the candidate blocks. Analysis of the candidate blocks may include comparing the candidate blocks of the de-grained video with corresponding blocks of the input video as originally presented. Thus, comparing the candidate blocks and the corresponding blocks may provide film grain information that may be used to generate the film grain description. The film grain description may be sent to a video encoder.

The systems and methods described herein may provide a non-destructive process of video encoding such that the video encoder performs operations based on an original version of the input video that has not been irreparably modified by the film de-grainer. The video encoder may receive the input video in an original form such that original film grain is present. The video encoder may also receive the film grain description from the film grain description estimator. The video encoder may configure one or more encoder settings used to compress the input video. In some situations, the one or more encoder settings may be adjusted in a non-conventional configuration to cause de-graining of the input video with an awareness of bandwidth requirements, such as a compression target or a bitrate limit. The one or more encoder settings may include one or more configuration parameters for one or more filters. The video encoder may encode the input video to generate an encoded video according to the one or more encoder settings. In some situations, the one or more encoder settings may cause the core encoding process to act as a de-graining filter that effectively removes the original film grain while maintaining visual fidelity of the encoded video. In some situations, the core encoding process would have been initially configured to preserve fidelity of the input video. However, the one or more encoder settings may repurpose the core encoding process to intentionally cause the film grain to be reduced or removed during the core encoding process. The video encoder may then provide the encoded video and the film grain description to a video destination, such as a content delivery network, a bitstream or a storage destination.

A video decoder may receive the encoded video and the film grain description. The video decoder may be configured to add synthetic film grain to the encoded video according to the film grain description in order to provide a film grain that resembles but does not necessarily mirror the original film grain from the input video.

As one skilled in the art will appreciate in light of this disclosure, embodiments may be capable of achieving certain technical advantages, including some or all of the following: reducing computational overhead to make a computer run more efficient, reducing memory requirements, reduce bandwidth consumption, non-destructive film grain removal, efficient video compression, etc.

In one embodiment, a system is disclosed. The system includes one or more processors and a memory storing instructions that, when executed on or across the one or more processors, cause the one or more processors to implement a video encoding system. The video encoding system may include a film grain description estimator and a video encoder. The film grain description estimator may be configured to filter an input video comprising original film grain to generate a de-grained video that excludes the original film grain. The film grain description estimator may be further configured to generate a film grain description based at least in part on analysis of one or more frames of the de-grained video. The video encoder may be configured to receive the input video and the film grain description. The video encoder may be configured to configure one or more encoder settings for compression of the input video to satisfy a compression target. The video encoder may be configured to encode an encoded video based at least in part on the one or more encoder settings. The video encoder may be configured to send the encoded video and the film grain description to a video destination.

In another embodiment, a computer-implemented method is disclosed. The method may be performed by on or across one or more computing devices. The method may include performing, by a film grain description estimator, receiving an input video comprising film grain and analyzing the input video to generate a film grain description for the input video. The method may include performing, by a film grain description estimator, receiving an input video comprising film grain and analyzing the input video to generate a film grain description for the input video. The method may also include performing, by a video encoder, receiving the input video, configuring one or more encoder settings based on presence of the film grain to achieve a compression target for the input video, encoding the input video comprising film grain using the one or more encoder settings, and sending the encoded video and the film grain description to a video destination.

In yet another embodiment, one or more computer-readable storage media storing instructions are disclosed. The instructions, when executed on or across one or more processors, cause the one or more processors to perform operations. The operations include analyzing an input video that comprises film grain to generate a film grain description for the input video. The operations may also include configuring one or more encoder settings based on presence of the film grain to achieve a compression target for the input video, encoding the input video comprising film grain using the one or more encoder settings, and sending the encoded video and the film grain description to a video destination.

FIG. 1 illustrates a block diagram of a video encoding system 100 that includes a film grain description estimator 110 and a video encoder 120, according to some embodiments. An input video 102 may be provided to the film grain description estimator 110 from a video source, such as a storage service, a data store, a remote client, or any other suitable source.

The input video 102 may include film grain, where film grain includes one or more random elements that correspond to high frequency noise in the input video 102. In some situations, the film grain may be caused by imperfections in the physical medium on which the input video 102 is stored or viewed. For example, in situations where the input video 102 was recorded to or stored on film, there may be imperfections that are inherent to the film medium. In other situations, film grain may have been added in post-production of a digitally produced movie in order to retain an aesthetic element that is associated with movies on film.

The film grain description estimator 110 may receive the input video 102, according to some embodiments. The input video 102 may be provided to a de-grain filter 112. In some embodiments, the de-grain filter 112 may be configured to reduce or remove the film grain from the input video 102. For example, the de-grain filter 112 may include one or more low pass filters configured to reduce or remove high frequency noise from the input video 102 while also permitting low frequency data to be preserved. In some embodiments, the de-grain filter 112 may be configured with one or more filter settings that prioritize speed and/or computational efficiency rather than prioritizing quality or fidelity retention. For example, the de-grain filter 112 may focus on reducing or removing the film grain from the input video 102 in a faster manner than other de-graining filters that may have to retain visual fidelity or quality of the input video 102 when generating a de-grained video. As another example, the de-grain filter 112 may be less resource intensive than other de-grain filters that may have to retain visual fidelity or quality of the input video 102 when generating a de-grained video. In yet another example, the de-grain filter 112 may include a motion compensated temporal filter configured in a temporal aggressive mode. Alternatively, the de-grain filter 112 may include a low pass filter such as a Gaussian blurring kernel.

The de-grain filter 112 may generate a de-grained video based on applying one or more filters to reduce or remove the film grain from the input video 102, according to some embodiments. For example, the de-grain filter 112 may generate the de-grained video as a filtered copy of the input video 102. In some situations, filtering videos may be a destructive process such that the output video is permanently altered from the input. In conventional film grain estimation systems, the de-grain filter sends the de-grained video to a video encoder, so the de-grain filter must be configured to maintain overall quality or fidelity of the input video. The de-grain filter 112 may provide the de-grained video to a film grain description generator 114.

The film grain description generator 114 may receive the de-grained video from the de-grain filter 112, according to some embodiments. The film grain description generator 114 may also receive the input video 102 including the original film grain, according to some embodiments. film grain description generator 114 may be configured to perform an analysis on the de-grained video and the input video 102 in order to generate a film grain description that may be used to generate film grain. In some embodiments, the generated film grain may include characteristics of the original film grain while not necessarily being an exact copy of the original film grain as it appears in the input video 102. For example, the generated film grain may reflect an overall aesthetic or feel of the original film grain while not being a copy, such that the original film grain will not be directly reproduced or synthesized from the film grain description.

The film grain description generator 114 may perform an analysis of at least the input video 102 to generate a film grain description for the input video 102, according to some embodiments. For example, the film grain description generator 114 may generate the film grain description based on determining an amount of film grain present in the input video 102. As another example, the film grain description generator 114 may further determine various measurable aspects of the film grain appearing in the input video 102. In some embodiments, the film grain description generator 114 may measure textures of individual blocks in the de-grained video to identify one or more candidate blocks of the de-grained video. Blocks may correspond to subsets of pixels in one or more frames of the de-grained video or the input video 102. The candidate blocks may be subsets of respective frames of the de-grained video. For example, the film grain description generator 114 may select the candidate blocks based on criteria that would result in a clearer comparison between the candidate blocks of the de-grained video compared to corresponding blocks of the input video 102 such that the difference may indicate the film grain as included in the input video 102.

The film grain description generator 114 may be configured to measure texture of blocks in the de-grained video, according to some embodiments. For example, the film grain description generator 114 may measure texture to identify portions of the de-grained video that do not have a wide array of colors or shapes. When the texture of a given portion of the de-grained video has a narrow array of colors or shapes, the texture may be referred to as a "flat" texture. In some situations, a flat texture for a given block may facilitate a less complex comparison between the de-grained video and the input video. In some embodiments, the film grain description generator 114 may quantify the measured textures of the blocks and select an arbitrary number of blocks to be used for the analysis described herein. For example, the film grain description generator 114 may identify and select N number of blocks to be used as candidate blocks for film grain analysis.

The analysis performed by the film grain description generator 114 may include a comparison of the de-grained video and the input video 102. In some embodiments, the analysis may include identifying one or more candidate blocks of the de-grained video to be analyzed. In some embodiments, the film grain description generator 114 may perform the analysis based on providing portions of the de-grained video and the input video 102 to an auto-regressive equation system solver. For example, the film grain description generator 114 may provide the candidate blocks and the corresponding blocks of the input video 102 to the auto-regressive equation, where solving the auto-regressive equation may produce information indicating a difference between the candidate blocks and the corresponding blocks of the input video 102. In other embodiments, the film grain description generator 114 may perform the analysis based on a comparison between the candidate blocks and the corresponding blocks of the input video 102. For example, the film grain description generator 114 may calculate a difference between the candidate blocks and the corresponding blocks of the input video 102, where the difference may correspond to the film grain present in the input video 102 because the candidate blocks may have reduced or removed the film grain during the de-graining process. In some embodiments, the film grain description generator 114 may estimate the film grain description according to the analysis performed on the candidate blocks and the corresponding blocks of the input video 102. For example, the film grain description generator 114 may estimate film grain parameters based on results of the analysis to recreate a visually similar film grain to be applied at a later time.

The film grain description generator 114 may generate the film grain description 116 based on the estimated film grain parameters, according to some embodiments. For example, the film grain description 116 may be interpreted by a video encoder or a video decoder to apply a synthesized film grain to a video that has been de-grained or does not otherwise have film grain present. In some embodiments, the film grain description generator 114 may send the film grain description 116 to a video encoder 120. In other embodiments, the film grain description generator 114 may send the film grain description 116 to be included as part of an output of the video encoding system without sending the film grain description 116 to the video encoder 120.

The video encoder 120 may receive the input video 102 with the original film grain present, according to some embodiments. For example, the input video 102 may be provided by the video source to the video encoder 120. As another example, the video encoding system 100 may be configured to direct copies of the input video 102 to both the film grain description estimator 110 and the video encoder 120 such that the same input video 102 is effectively provided to both the film grain description estimator 110 and the video encoder 120. By providing the input video 102 to the video encoder 120, the output of the video encoding system 100 may have improved quality over encoding the de-grained video from the de-grain filter 112 of the film grain description estimator 110.

The video encoder 120 may include film grain logic 122 configured to determine whether to encode the input video 102 based on presence of the film grain, according to some embodiments. For example, the film grain logic 122 may determine whether the input video 102 includes film grain, such as by metadata of the input video 102 including a flag indicating the presence of the film grain. As another example, the film grain logic 122 may determine whether the input video 120 includes the film grain based on the video encoder 120 receiving the film grain description 116 for the input video 102.

Based on a determination that the input video 102 includes film grain, the video encoder 120 may configure one or more encoder settings 124 based on presence of the film grain, according to some embodiments. For example, the video encoder 120 may configure the encoder settings 124 to achieve a compression target for the input video 120. When film grain is present in the input video 120, conventional video encoding techniques may be insufficient to achieve the compression target based on the random nature of the film grain such that compression of the input video 120 will be sub-standard or inadequate to maintain a higher compression ratio relative to compressing a video that does not include film grain. The compression target may be associated with a bitrate to maintain connection stability between one or more components of the video encoding system 100. For example, the compression target may set the bitrate to ensure that a downstream video consumer does not lose a consistent streaming connection to the video encoding system 100 for consumption of the output video.

The encoder settings 124 may include one or more configuration parameters for modifying operation of a core encoding process 126, according to some embodiments. The core encoding process 126 may also be referred to as a core encoding loop. For example, the encoder settings 124 may cause the core encoding process 126 to perform different operations depending on the encoder settings 124. In some embodiments, the video encoder 120 may configure the encoder settings 124 in a particular configuration based on the presence of the film grain in the input video 102, while the video encoder 120 may configure the encoder settings 124 in a different particular configuration based on the lack of film grain in the input video 102.

The video encoder 120 may configure the encoder settings 124 to have the effect of de-graining the input video 102, according to some embodiments. For example, the video encoder 120 may configure the core encoding process 126 according to the encoder settings 124 to de-grain the input video 102 to improve compression of the input video 102 by the core encoding process 126. In some embodiments, de-graining the input video 102 by the core encoding process 126 may result in a higher quality output video based on the encoder settings 124. For example, the core encoding process 126 may receive information indicating the compression target to serve as a basis for encoding the input video 102. In some embodiments, the video encoder 120 may configure the encoder settings 124 based on the film grain description 116 generated by the film grain description estimator 110. For example, the video encoder 120 may extrapolate characteristics of the film grain in the input video 102 from the film grain description 116 and modify the encoder settings 124 based on the extrapolated characteristics of the film grain. As another example, the encoder settings 124 may be determined based on one or more of an opacity of the film grain, a texture of the film grain, a distribution of the film grain, a graininess level of the film grain, a noise level of the film grain, or other quantifiable characteristics of the film grain.

The encoder settings 124 may cause the core encoding process 126 to perform one or more in-loop filter operations with different arguments or settings as indicated by the encoder settings 124, according to some embodiments. The filter operations may be referred to "in-loop" based on being implemented as part of the core encoding process 126. In some embodiments, the in-loop filter operations may include one or more of an adaptive temporal filter, a quantizer, a mode decision, a bias DC mode, a motion estimation interpolation filter, a digital loop filter, a deblocking filter, a constrained directional enhancement filter, or other suitable filter types. For example, the filter operations may have different settings that are configured by the encoder settings 124 to reduce or remove the film grain in the input video 102.

The core encoding process 126 may encode the input video 102 according to one or more compression standards or formats, according to some embodiments. For example, the core encoding process 126 may include a video encoder or codec according to the Alliance for Open Media Video 1 (AV1) compression standard, the H.264/Advanced Video Coding (AVC) compression standard, the H.265/High Efficiency Video Coding (HEVC) compression standard, the VP9 compression standard, the Theora codec, or any other suitable video codec or compression standard.

The core encoding process 126 may encode the input video 102 to produce an encoded video 128, according to some embodiments. For example, the core encoding process 126 may generate the encoded video 128 based on encoding the input video 102 according to the encoder settings 124. The video encoder 120 may provide the encoded video 128 to a bitstream that is output from the video encoder 120. In some embodiments, the video encoder 120 may also provide the film grain description 116 to the bitstream. In other embodiments, the video encoder 120 may provide the encoded video 128 and the film grain description 116 to a video destination. For example, the video encoder 120 may provide the encoded video 128 and the film grain description 116 to a content delivery network that is configured to distribute the encoded video 128 and the film grain description 116 to a video consumer. In some embodiments, the encoded video may be streamed to the video consumer over a network. For example, the encoded video may be streamed via the Internet to the video consumer.

In some embodiments, the video consumer may include a video decoder configured to perform film grain synthesis to generate the film grain for playback of the encoded video 128. The video decoder may decode the encoded video 128 to generate a decoded video. The video decoder may generate the film grain according to the film grain description 116 for integration with the decoded video. The video decoder may send the decoded video and the generated film grain to an output destination. For example, the output destination may include a display device configured to display videos. As another example, the output destination may include a storage device configured to store the decoded video integrated with the generated film grain.

Figure 2:
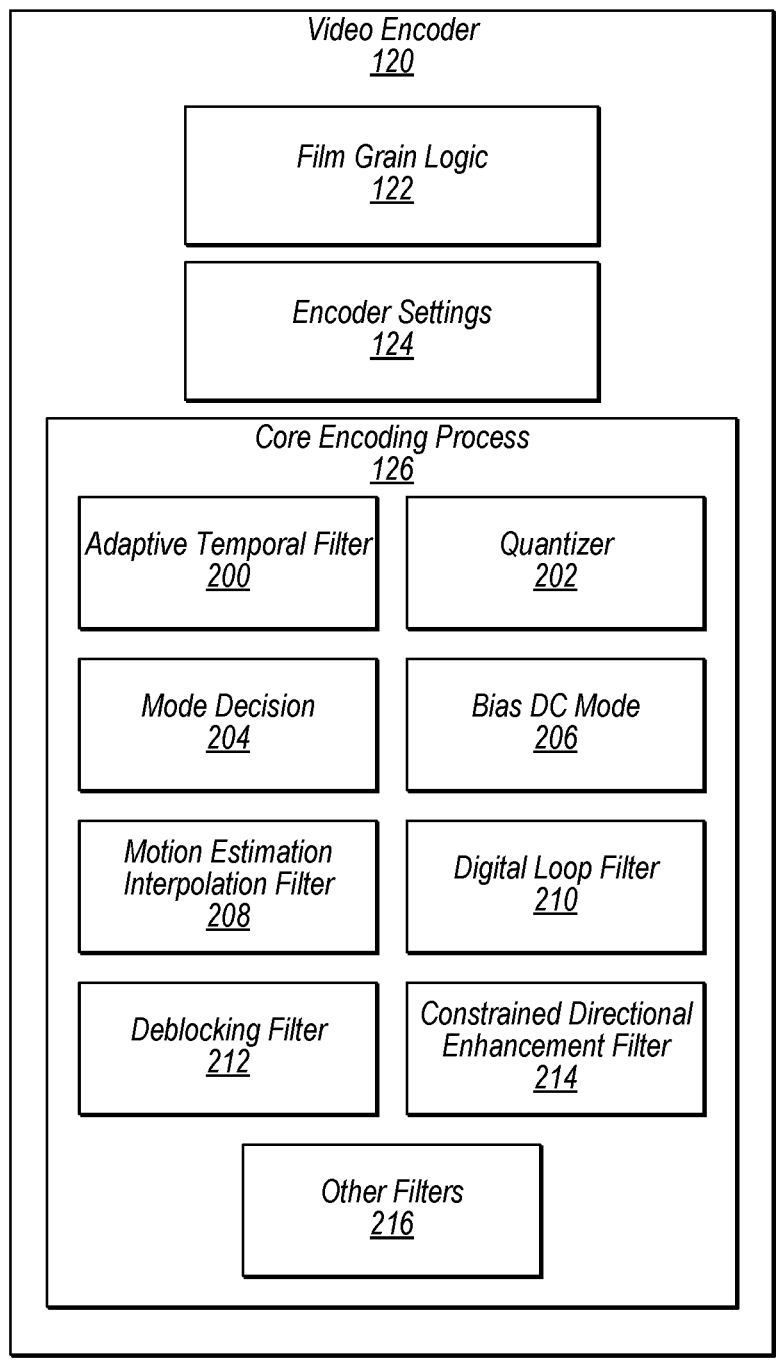
FIG. 2 is a block diagram illustrating a video encoder, according to some embodiments.

FIG. 2 is a block diagram illustrating a video encoder 120, according to some embodiments. The video encoder 120 of FIG. 2 may correspond to the video encoder 120 of FIG. 1, in some embodiments. The video encoder 120 may be configured to encode an input video, such as the input video 102 of FIG. 1, according to some embodiments.

The video encoder 120 may include one or more encoder settings 124 configured to affect one or more operations of a core encoding process 126, according to some embodiments. For example, the encoder settings 124 may affect operations of one or more in-loop filters. As an illustrative example, the in-loop filters may include one or more of an adaptive temporal filter 200, a quantizer 202, a mode decision 204, a bias DC mode 206, a motion estimation interpolation filter 208, a digital loop filter 210, a deblocking filter 212, a constrained directional enhancement filter 214, or other filters 216 configured to process video data, such as the input video.

The video encoder 120 may configure the encoder settings 124 to adjust performance of the core encoding process 126 based on a determination that the input video includes film grain, according to some embodiments. For example, the video decoder 120 may include film grain logic 122 configured to determine whether the input video includes film grain. In some embodiments, the film grain logic 122 may determine whether the input video includes film grain based on information provided with the input video. For example, the input video may include metadata that indicates that film grain is present in the input video. As another example, the input video may be sent to the video encoder with a film grain description that describes the film grain in the input video such that the film grain can be synthesized according to the film grain description. The film grain description may be generated in a manner as described with respect to the film grain description estimator 110 of FIG. 1, according to some embodiments.

The encoder settings 124 may include various configuration settings for one or more aspects of the core encoding process 126. For example, filters included as part of the core encoding process 126 may be configured according to the encoder settings 124. The following non-limiting examples of possible encoder settings 124 illustrate some various types of configurations for the core encoding process 126 that may allow the core encoding process 126 to process the input video while avoiding introduction of artifacts into the output of the core encoding process 126. The encoder settings 124 may enable the adaptive temporal filter 200. The encoder settings 124 may offset the quantizer 202 and adjust a rounding offset such that quantization in the transform domain may filter out high frequency noise, such as the film grain, while preserving low frequency data in the input video. The encoder settings 124 may offset the mode decision 204 lambda value to select a mode that generates lower coefficients or blocks with lower texture to reduce bandwidth. The encoder settings 124 may bias the DC mode 206 in intra frames to act as a smoothing filter for the input video. The encoder settings 124 may set the motion estimation interpolation filter 208 to a smooth setting. The encoder settings 124 may set the digital loop filter 210 and/or the deblocking filter 212 to the lowest sharpness value to improve picture smoothness. The encoder settings 124 may offset restoration modes of the constrained directional enhancement filter 214 toward less preservation to act as a low pass or denoising filter by increasing the strength of the filter. The above non-limiting examples of encoder settings 124 may be modified without departing from the overall scope and purpose of the encoder settings 124 to cause changes to operations of the core encoding process 126.

Figure 3:
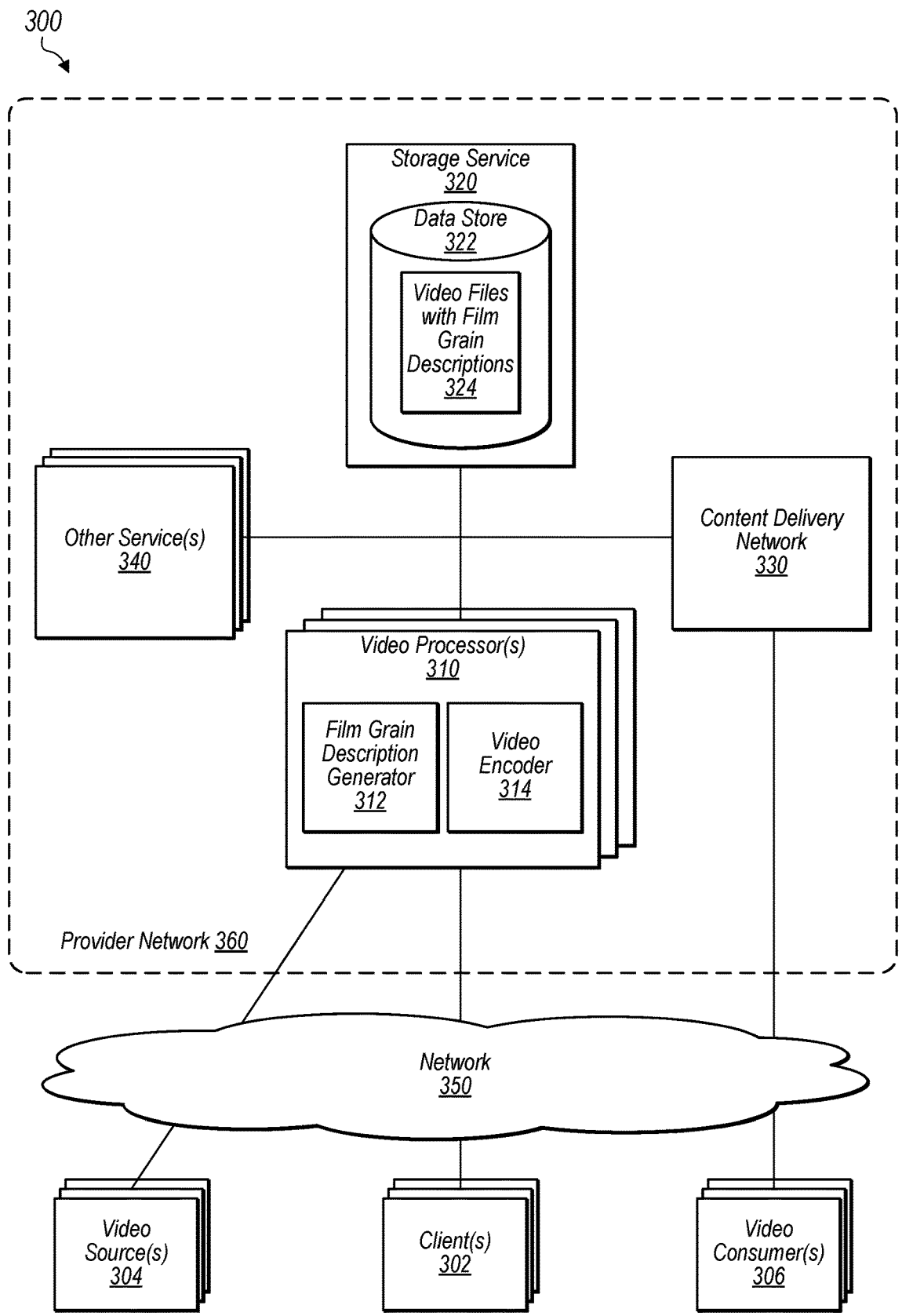
FIG. 3 is a block diagram illustrating a provider network environment for encoding videos with film grain synthesis, according to some embodiments.

FIG. 3 illustrates a block diagram of a provider network environment 300 for encoding videos with film grain synthesis, according to some embodiments. The provider network environment 300 may include a provider network 360, according to some embodiments. The provider network 360 may include a plurality of computing resources configured to offer various services to one or more clients 302 via a network 350. The network 350 may include the Internet, a local area network, a wide area network, a cellular network, or any other suitable network type.

The provider network 360 may include one or more computing resources that host compute instances configured to provide one or more video processors 310 for the clients 302. In some embodiments, the compute instances may be implemented on the same computing resource or across multiple computing resources. For example, the compute instances executing the video processors 310 may be hosted in a distributed computing system configured to provide services as part of the provider network 360.

The video processors 310 may include a film grain description generator 312 and a video encoder 314, according to some embodiments. The video processors 310 may receive input videos from one or more video sources 304 via the network 350, according to some embodiments. In other embodiments, the video processors 310 may receive input videos from a storage service 320 within the provider network 360.

The film grain description generator 312 may be configured to generate a film grain description for an input video that includes film grain, according to some embodiments. For example, the film grain description generator 312 may be perform an analysis on the input video to generate the film grain description. One example of the analysis is described with respect to the film grain description generator 114 of FIG. 1, according to some embodiments. The film grain description generator 312 may provide the film grain description to the video encoder, according to some embodiments. In other embodiments, the film grain description generator 312 may provide the film grain description to another destination. For example, the film grain generator 312 may provide the film grain description to the storage service 320, the content delivery network 330, or one or more other services 340.

The video processors 310 may include a video encoder 314, according to some embodiments. The video encoder 314 may correspond to the video encoder 120 of FIG. 1 or the video encoder 120 of FIG. 2, according to some embodiments. The video encoder 314 may be configured to encode the input video according to encoder settings that are configured based on the input video including film grain, according to some embodiments. For example, the encoder settings may be configured to improve compression of the input video to achieve a compression target. The video encoder 314 may improve the compression by reducing random noise, such as the film grain, which impedes or reduces effectiveness of compression. In some embodiments, the video encoder 314 may configure the encoder settings based on the film grain description. For example, the video encoder 314 may obtain information about the film grain in the input video by analyzing the film grain description. The video encoder 314 may encode the input video to generate an encoded video that may be provided to video destination, according to some embodiments. For example, the video processors 310 may provide the encoded video to the storage service 320, the content delivery network 340, or the other services 340.

The storage service 320 may include a data store 322, according to some embodiments. The data store 322 may include one or more storage devices configured to store data. In some embodiments, the data store 322 may store video files with film grain descriptions 324. For example, the data store 322 may receive the encoded video from the video processors 310 and the corresponding film grain description and store the encoded video with the film grain description 324. The storage service 320 may maintain the video files with film grain descriptions 324 for subsequent archival and/or retrieval.

The content delivery network 330 may include one or more computing resources configured to provide the encoded video and the film grain description to one or more video consumers 306, according to some embodiments. The video consumers 306 may include a video decoder configured to decode the encoded video. The video consumers 306 may be configured to generate film grain based on the film grain description generated by the film grain description generator 312. In some embodiments, the video decoder may be configured to integrate the decoded video with the generated film grain. The video decoder may then provide the decoded video with the generated film grain to a display device for playback of the decoded video with the generated film grain.

Figure 4:
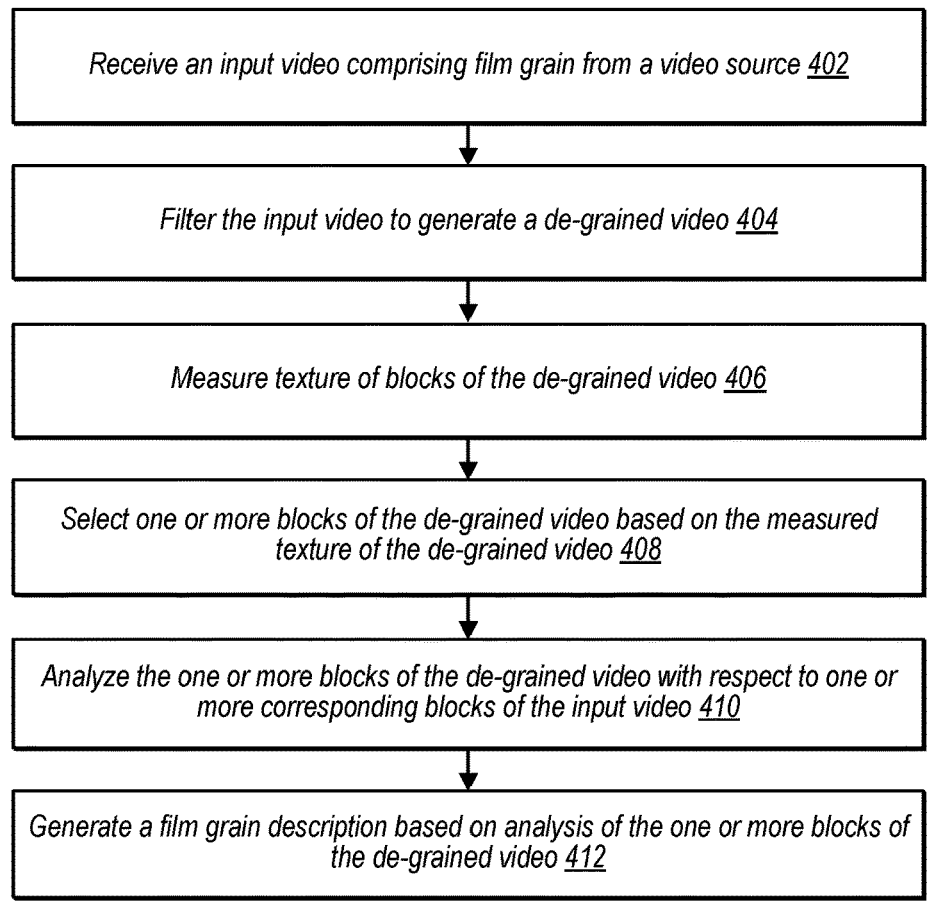
FIG. 4 is a flowchart diagram illustrating a method for generating a film grain description for an input video that includes film grain, according to some embodiments.

FIG. 4 is a flowchart diagram illustrating a method 400 for generating a film grain description for an input video that includes film grain, according to some embodiments. The method 400 may be performed by a film grain description estimator, according to some embodiments. The film grain description estimator may be implemented on or across one or more computing devices in some embodiments. The film grain description estimator may correspond to the film grain description estimator 110 of FIG. 1 or the film grain description generator 312 of FIG. 3, in various embodiments.

The method 400 may include receiving an input video comprising film grain from a video source, at 402. In some embodiments, the film grain description estimator may receive the input video from the video source via a network connection such as the Internet. The input video may correspond to the input video 102 of FIG. 1, according to some embodiments. The video source may correspond to the video sources 304 of FIG. 3, according to some embodiments.

The method 400 may also include filtering the input video to generate a de-grained video, at 404. In some embodiments, the film grain description estimator may include a de-grain filter configured to reduce or remove film grain from videos, such as the input video. The de-grain filter may correspond to the de-grain filter 112 of FIG. 1, according to some embodiments. In some embodiments, the de-grain filter may be configured to reduce or remove the appearance of the film grain from the input video. For example, the de-grain filter may include one or more low pass filters configured to reduce or remove high frequency noise, that may include the film grain, from the input video while passing through low frequency data that corresponds to video data in the input video. In some embodiments, the de-grain filter may be configured with one or more filter settings that prioritize speed and/or computational efficiency rather than prioritizing quality or fidelity retention. For example, the de-grain filter may not necessarily require high quality texture preservation to maintain the appearance of the de-grained video for visual consumption by a viewer.

The method 400 may further include measuring texture of blocks of the de-grained video, at 406. The film grain description estimator be configured to measure the texture of the blocks in order to identify potential candidate blocks for subsequent analysis, according to some embodiments. The blocks may represent subsets of frames of the de-grained video. For example, the blocks may represent portions of one or more frames in the de-grained video. In some embodiments, the texture of the blocks may be measured to identify how variable colors are within a given block. For example, a block with a texture that indicates a lower color gamut within the block may be referred to as a flat block. Non-limiting examples of a flat block may include a solid color, a small number of colors, or a gradient of similar colors. Non-limiting examples of a textured block may include a wide array of colors, a random color assortment, or inconsistent color distributions.

The method 400 may also include selecting one or more blocks of the de-grained video based on the measured texture of the de-grained video, at 408. In some embodiments, the film grain description estimator may select the one or more blocks based on relative flatness of the texture of the blocks when compared in view of other blocks of the de-grained video. For example, the film grain description estimator may select an arbitrary number of the flattest blocks in the de-grained video as candidate blocks on which an analysis is performed.

The method 400 may further include analyzing the one or more blocks of the de-grained video with respect to one or more corresponding blocks of the input video, at 410. In some embodiments, the film grain description estimator may perform an analysis based on a comparison between the one or more blocks of the de-grained video and the one or more corresponding blocks of the input video. For example, the difference between the blocks of the de-grained video and the input video may indicate the film grain that was reduced or removed by the de-grain filter, as described herein. In some embodiments, the analysis may include providing the one or more blocks of the de-grained video and the one or more corresponding blocks of the input video as inputs to an auto-regressive equation system solver. For example, the auto-regressive equation system may be configured to determine the difference between the one or more blocks of the de-grained video and the one or more corresponding blocks of the input video.

The method 400 may conclude by generating a film grain description based on the analysis of the one or more blocks of the de-grained video, at 412. In some embodiments, the film grain description estimator may be configured to generate the film grain description to provide information describing the film grain in the input video. For example, the film grain description estimator may generate the film grain description based on the comparison between the de-grained video and the input video to identify the film grain. In some embodiments, the film grain description may be used by a video encoder or a video decoder to procedurally generate a synthesized version of the film grain that maintains a similar aesthetic to the original film grain in the input video that resembles, but not necessarily replicates, the original film grain. In some embodiments, the film grain description may be sent to one or more destinations. For example, the film grain description may be sent to a video encoder, a video decoder, a storage service, or another output destination.

Figure 5:
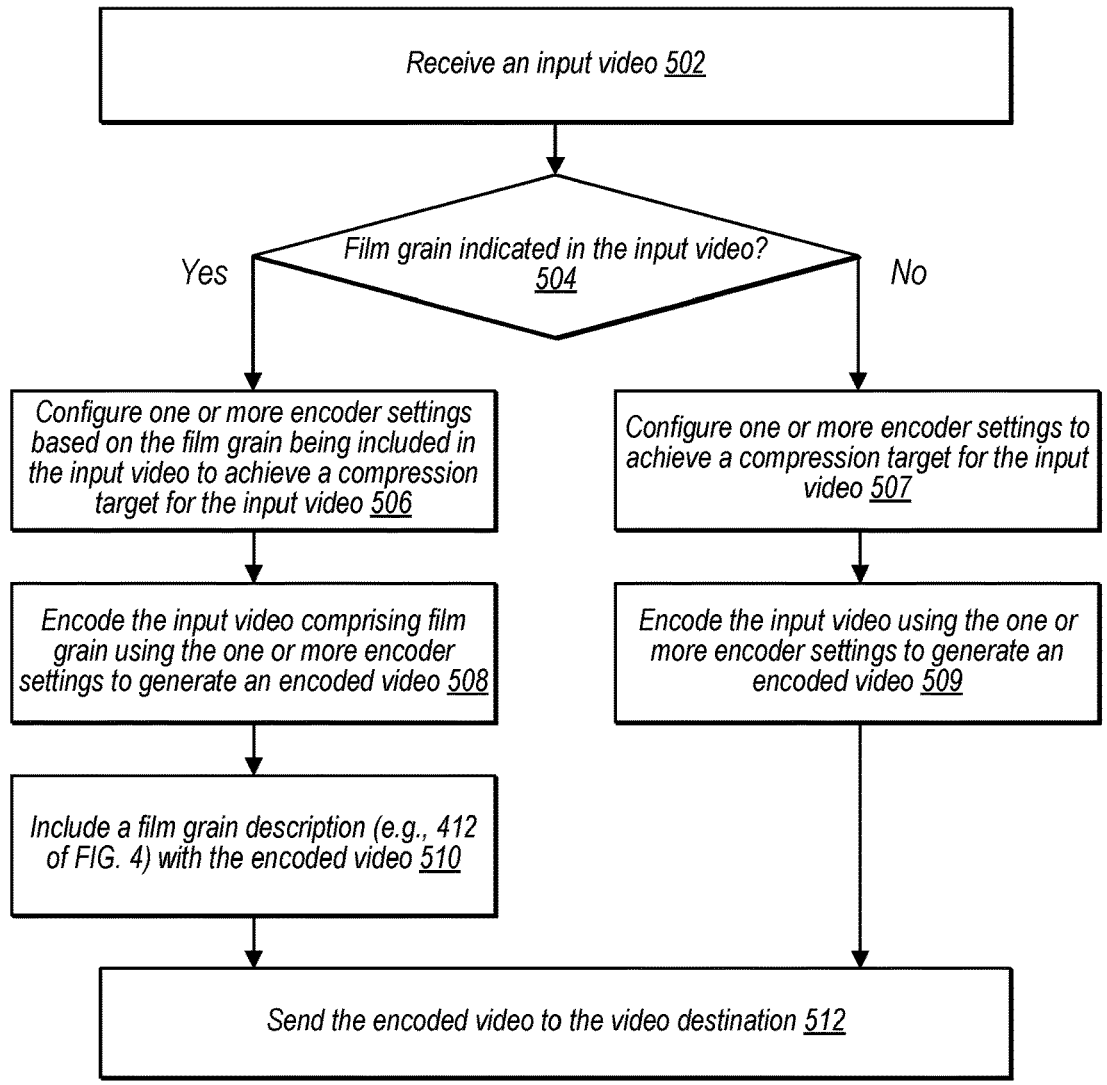
FIG. 5 is a flowchart diagram illustrating a method for encoding an input video that includes film grain, according to some embodiments.

FIG. 5 is a flowchart diagram illustrating a method 500 for encoding an input video that includes film grain, according to some embodiments. The method 500 may be performed by a video encoder implemented on or across one or more computing devices, according to some embodiments. The video encoder may correspond to the video encoder 120 of FIG. 1, the video encoder 120 of FIG. 2, or the video encoder 314 of FIG. 3, according to various embodiments.

The method 500 includes receiving an input video, at 502. The video encoder may receive the input video from a video source. The input video may correspond to the input video 102 of FIG. 1, according to some embodiments. The video source may correspond to the video sources 304 of FIG. 3, according to some embodiments. In some embodiments, the video source that provided the input video to the film grain description estimator may provide the same input video to the video encoder.

The method 500 also includes determining whether film grain is indicated in the input video, at 504. In some embodiments, the video encoder may include film grain logic configured to determine whether the film grain is indicated in the input video based on additional information indicating a presence of the film grain. The film grain logic may correspond to the film grain logic 122 of FIG. 1 or the film grain logic 122 of FIG. 2, according to some embodiments. For example, the input video may be accompanied by metadata that may indicate that the film grain is present in the input video. As another example, the video encoder may determine that the film grain is present based on receiving a film grain description for the input video from a film grain description estimator, such as described with respect to FIG. 4.

Based on a determination that the film grain is indicated in the input video, the method 500 further includes configuring one or more encoder settings based on the film grain being included in the input video to achieve a compression target for the input video, at 506. The one or more encoder settings may correspond to the encoder settings 124 of FIG. 1, according to some embodiments. The encoder settings may modify operations of the video encoder in order to improve encoding or processing of the input video. For example, the encoder settings may be configured or adjusted to accommodate for the presence of the film grain. In some embodiments, the encoder settings may be configured to cause the film grain in the input video to be reduced or removed. For example, the encoder settings may cause the video encoder to perform one or more operations that act similarly to a low pass or denoising filter that may cause high frequency noise, such as the film grain, to be removed from the input video. In some embodiments, the video encoder may configure the encoder settings based on the film grain description for the input video. For example, the video encoder may determine the encoder settings based on information extrapolated from analyzing the film grain description based on a better understanding of the film grain present in the input video. The compression target may include a target bitrate or a target file size, according to some embodiments. In some embodiments, the compression target may be indicated in the one or more encoder settings. As another example, the compression target may be indicated by a requesting client. In yet another example, the compression target may be one of many compression targets to include a wide array of potential bitrates or resolutions for delivery of the encoded video.

The method 500 also includes encoding the input video comprising film grain using the one or more encoder settings to generate an encoded video, at 508. The video encoder may be configured based on the one or more encoder settings. In some embodiments, the one or more encoder settings may cause the video encoder to perform various operations in different manners based on different ones of the one or more encoder settings. For example, a particular encoder setting may adjust the video encoder to perform a different mode of filtering when compared to a different encoder setting. In some embodiments, the video encoder may be configured to compress the input video as part of the encoding process. For example, the video encoder may compress the input video in accordance with the one or more encoder settings. As another example, the video encoder may compress the input video to achieve the compression target. The video encoder may include one or more filters that may be configured according to the one or more encoder settings. For example, the one or more filters may include one or more of an adaptive temporal filter, a quantizer, a mode decision, a bias DC mode, a motion estimation interpolation filter, a digital loop filter, a deblocking filter, a constrained directional enhancement filter, or other suitable filter types. In some embodiments, the encoded video may have reduced or removed film grain relative to the input video. For example, the one or more encoder settings may adjust the video encoder to reduce or remove high frequency noise from the input video during the encoding process to generate the encoded video. In some embodiments, the video encoder may include one or more compression standards or formats. For example, the video encoder may include an encoder or codec according to the Alliance for Open Media Video 1 (AV1) compression standard, the H.264/Advanced Video Coding (AVC) compression standard, the H.265/High Efficiency Video Coding (HEVC) compression standard, the VP9 compression standard, the Theora codec, or any other suitable video codec or compression standard.

The method 500 further includes including a film grain description with the input video, at 510. In some embodiments, the film grain description may be generated by a film grain description estimator. For example, the film grain description may be generated by the film grain description estimator 110 of FIG. 1, the film grain description generator 312 of FIG. 3, or according to the method 400 of FIG. 4. In embodiments where the film grain description is provided by the film grain description estimator to the video encoder, the video encoder may be configured to include the film grain description with the encoded video generated by the video encoder. In some embodiments, the film grain description may be sent by the video encoder without additional modification to the film grain description by the video encoder. For example, the video encoder may pass along the film grain description to the video destination without modifications.

Based on a determination that the film grain is not indicated in the input video, the method 500 may include configuring one or more encoder settings to achieve a compression target for the input video, at 507. In some embodiments, the one or more encoder settings may set to standard values for general video encoding without regard to the presence of film grain in the input video. The compression target may include a target bitrate or a target file size, according to some embodiments. In some embodiments, the compression target may be indicated in the one or more encoder settings. As another example, the compression target may be indicated by a requesting client. In yet another example, the compression target may be one of many compression targets to include a wide array of potential bitrates or resolutions for delivery of the encoded video.

The method 500 further includes encoding the input video using the one or more encoder settings to generate an encoded video, at 509. The video encoder may encode the input video without film grain indicated according to the one or more encoder settings to generate the encoded video. In some embodiments, encoding the input video may include compressing the input video. For example, the video encoder may compress the input video to achieve the compression target. In some embodiments, the video encoder may include one or more compression standards or formats. For example, the video encoder may include an encoder or codec according to the Alliance for Open Media Video 1 (AV1) compression standard, the H.264/Advanced Video Coding (AVC) compression standard, the H.265/High Efficiency Video Coding (HEVC) compression standard, the VP9 compression standard, the Theora codec, or any other suitable video codec or compression standard.

The method 500 concludes by sending the encoded video to the video destination, at 512. The video destination may correspond to one or more of the storage service 320, the content delivery network 330, the other services 340 of FIG. 3. In some embodiments, the encoded video may be sent by the video encoder to the video destination to be distributed to a video consumer for viewing. In situations where film grain is indicated in the input video, the encoded video may be sent with the film grain description that is included with the encoded video.

Figure 6:
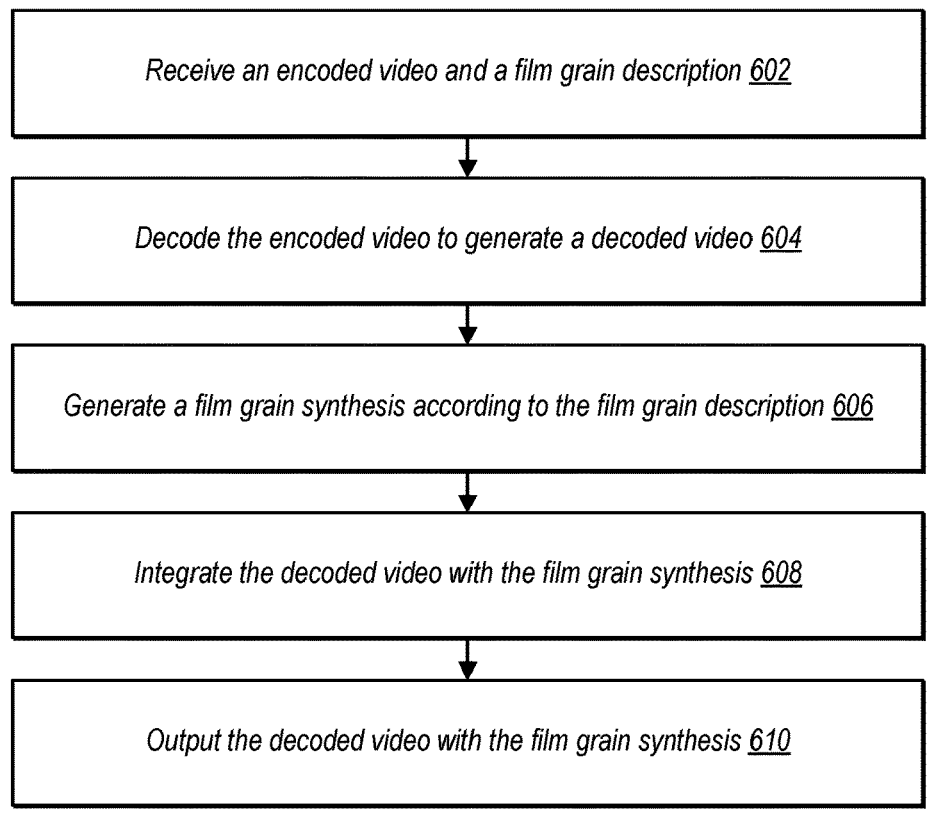
FIG. 6 is a flowchart diagram illustrating a method for film grain synthesis of an encoded video and a film grain description, according to some embodiments.

FIG. 6 is a flowchart diagram illustrating a method 600 for film grain synthesis of an encoded video and a film grain description, according to some embodiments. The method 600 may be performed by a video decoder implemented on or across one or more computing devices, according to some embodiments. The video decoder may correspond to the video decoders 306 of FIG. 3, according to some embodiments.

The method 600 includes receiving an encoded video and a film grain description, at 602. In some embodiments, the video decoder may receive the encoded video and the film grain description from a content delivery network. For example, the content delivery network may have received the encoded video and the film grain description from a video encoder as described with respect to FIG. 5. In other embodiments, the video decoder may receive the encoded video and the film grain description from the video encoder.

The method 600 also includes decoding the encoded video to generate a decoded video, at 604. The video decoder may decode the encoded video according to the encoding standard applied to the encoded video. In some embodiments, the video decoder may include one or more compression standards or formats. For example, the video decoder may include a decoder or codec according to the Alliance for Open Media Video 1 (AV1) compression standard, the H.264/Advanced Video Coding (AVC) compression standard, the H.265/High Efficiency Video Coding (HEVC) compression standard, the VP9 compression standard, the Theora codec, or any other suitable video codec or compression standard.

The method 600 further includes generating a film grain synthesis according to the film grain description, at 606. In some embodiments, the video decoder may generate a synthesized film grain that resembles, but not necessarily replicates, the original film grain from the input video. For example, the video decoder may generate film grain based on the film grain description which may provide information used to procedurally recreate film grain that resembles the original film grain.

The method 600 also includes integrating the decoded video with the film grain synthesis, at 608. In some embodiments, the video decoder may be configured to combine the decoded video with the generated film grain synthesis. For example, the video decoder may overlay the film grain synthesis onto the decoded video to have the decoded video appear underneath the film grain synthesis. In some embodiments, integrating the decoded video with the film grain synthesis may include generating an output video that combines the decoded video with the film grain synthesis.

The method 600 may conclude by outputting the decoded video with the film grain synthesis, at 610. In some embodiments, the video decoder may output the decoded video to a display device. For example, the video decoder may be integrated in a device that includes the display device, such as a personal computer, a mobile device, a tablet, a gaming console, or other device types. In other embodiments, the video decoder may output the decoded video to a storage device. For example, the storage device may store the decoded video for later playback.

Figure 7:
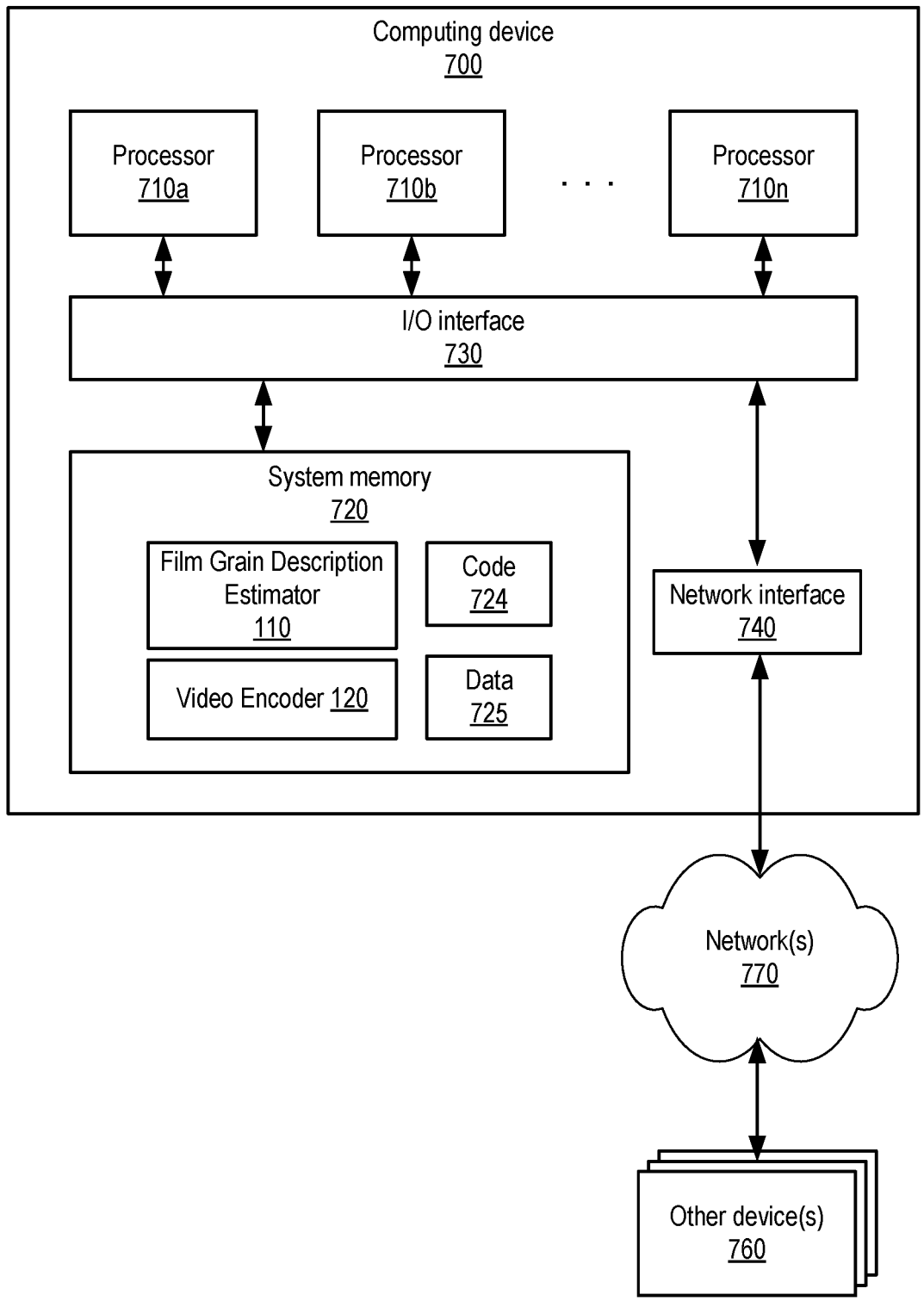
FIG. 7 is a block diagram illustrating an example computer system that may be used in some embodiments.

Any of various computer systems may be configured to implement techniques for managing memory compression in a secure manner, as disclosed herein. For example, FIG. 7 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 700 such as that illustrated in FIG. 7 or one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions on or across the processors 710. For example, in various embodiments, processors 710 may be embedded processors implementing any of a variety of instruction set architectures (ISAs), such as the x86, x86-64, ARM, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 720 as program instructions 724. In some embodiments, system memory 720 may include data 725 which may be configured as described herein. In some embodiments, system memory 720 may include film grain description estimator 110. For example, film grain description estimator 110 may perform the functions of film grain description generator 110 of FIG. 1, the functions of film grain description generator 312 of FIG. 3, or the method 400 of FIG. 4. In some embodiments, system memory 720 may include video encoder 120. For example, video encoder 120 may perform the functions of the video encoder 120 of FIG. 1, the video encoder 120 of FIG. 2, the video encoder 314 of FIG. 3, or the method 500 of FIG. 5.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as between client devices (e.g., 760, etc.) and other computer systems, or among hosts, for example. In particular, network interface 740 may be configured to allow communication between computer system 700 and/or various other devices 760 (e.g., I/O devices). Other devices 760 may include scanning devices, display devices, input devices and/or other communication devices, as described herein. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks 770, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, which may be implemented via network interface 740.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device (e.g., cursor control device, keyboard, or display(s) may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more processors; and
a memory storing instructions that, when executed on or across the one or more processors, cause the one or more processors to implement a video encoding system comprising:
a film grain description estimator configured to:
receive an input video comprising film grain;
analyze the input video to generate a film grain description for the input video; and
a video encoder configured to:
receive the input video;
responsive to a determination that the input video comprises film grain, configure one or more encoder settings to de-grain the input video as part of encoding to achieve a compression target; and
encode, according to the configured encoder settings, the input video comprising film grain to de-grain the input video to produce encoded video achieving the compression target; and
wherein the video encoding system is configured to send the encoded video and the film grain description to a video destination.

2. The system of claim 1, wherein the film grain description estimator is further configured to:
filter the input video to generate a de-grained video;
measure texture of a plurality of blocks of the de-grained video; and identify one or more blocks of the plurality of blocks based on relative amounts of the measured texture relative to other measured textures of other blocks of the plurality of blocks.

3. The system of claim 2, wherein to analyze the input video, the film grain description estimator is further configured to:
compare the one or more blocks of the de-grained video to one or more corresponding blocks of the input video; and
determine a difference between the one or more blocks of the de-grained video and the one or more corresponding blocks of the input video, wherein the film grain description is generated based at least in part on the difference.

4. The system of claim 1, wherein the video encoder is further configured to:
determine the one or more encoder settings based at least in part on characteristics of the film grain of the input video.

5. The system of claim 1, wherein the video encoding system is implemented as part of a provider network, wherein the video destination comprises a content delivery network configured to distribute the encoded video and the film grain description to a video consumer.

6. A method, comprising:
performing, by a film grain description estimator implemented by one or more computing devices:
receiving an input video comprising film grain; and
analyzing the input video to generate a film grain description for the input video; and
performing, by a video encoder implemented by one or more computing devices:
receiving the input video;
configuring, responsive to a determination the input video comprises film grain, one or more encoder settings to de-grain the input video as part of encoding to achieve a compression target;
encoding, according to the configured encoder settings, the input video comprising film grain to de-grain the input video to produce encoded video achieving the compression target; and
sending the encoded video and the film grain description to a video destination.

7. The method of claim 6, further comprising:
performing, by the film grain description estimator:
filtering the input video to generate a de-grained video;
measuring texture of a plurality of blocks of the de-grained video; and
identifying one or more blocks of the plurality of blocks based on relative amounts of the measured texture relative to other measured textures of other blocks of the plurality of blocks.

8. The method of claim 7, further comprising:
performing, by the film grain description estimator:
comparing the one or more blocks of the de-grained video to one or more corresponding blocks of the input video; and
determining a difference between the one or more blocks of the de-grained video and the one or more corresponding blocks of the input video, wherein the film grain description is generated based at least in part on the difference.

9. The method of claim 6, further comprising:
determining the one or more encoder settings based at least in part on characteristics of the film grain of the input video.

10. The method of claim 9, further comprising:
receiving the film grain description; and
determining the characteristics of the film grain based at least in part on the film grain description.

11. The method of claim 6, wherein encoding the input video comprises:
filtering high frequency noise comprising the film grain from the input video using one or more in-loop filters.

12. The method of claim 11, further comprising:
configuring the one or more filters according to the one or more encoder settings.

13. The method of claim 6, wherein the video destination comprises a content delivery network configured to send the encoded video and the film grain description to a video consumer.

14. One or more non-transitory, computer-readable storage media storing instructions that, when executed on or across one or more processors, cause the one or more processors to:
analyze an input video that comprises film grain to generate a film grain description for the input video;
responsive to a determined presence of the film grain in the input video, configure one or more encoder settings to de-grain the input video as part of encoding to achieve a compression target;
encode, according to the configured encoder settings, the input video comprising film grain to de-grain the input video to produce encoded video achieving the compression target; and
send the encoded video and the film grain description to a video destination.

15. The one or more non-transitory, computer-readable storage media of claim 14, further comprising instructions that, when executed on or across the one or more processors, cause the one or more processors to:
filter the input video to generate a de-grained video;
measure texture of a plurality of blocks of the de-grained video;
identify one or more blocks of the plurality of blocks based on relative amounts of the measured texture relative to other measured textures of other blocks of the plurality of blocks;
compare the one or more blocks of the de-grained video to one or more corresponding blocks of the input video; and
determine a difference between the one or more blocks of the de-grained video and the one or more corresponding blocks of the input video, wherein the film grain description is generated based at least in part on the difference.

16. The one or more non-transitory, computer-readable storage media of claim 14, further comprising instructions that, when executed on or across the one or more processors, cause the one or more processors to:
determine the one or more encoder settings based at least in part on characteristics of the film grain of the input video.

17. The one or more non-transitory, computer-readable storage media of claim 16, further comprising instructions that, when executed on or across the one or more processors, cause the one or more processors to:
determine the characteristics of the film grain based at least in part on the film grain description.

18. The one or more non-transitory, computer-readable storage media of claim 14, further comprising instructions that, when executed on or across the one or more processors, cause the one or more processors to:

filter high frequency noise comprising the film grain from the input video using one or more in-loop filters.

19. The one or more non-transitory, computer-readable storage media of claim 18, further comprising instructions that, when executed on or across the one or more processors, cause the one or more processors to:
configure the one or more filters according to the one or more encoder settings.

20. The one or more non-transitory, computer-readable storage media of claim 14, wherein the video destination comprises a storage service configured to store the encoded video and the film grain description to a data store.

* * * * *